United States Patent [19]

Buhl

[11] Patent Number: 4,586,840
[45] Date of Patent: May 6, 1986

[54] ELASTIC JOINT

[75] Inventor: Reinhard Buhl, Bohmte, Fed. Rep. of Germany

[73] Assignee: Lemförder Metallwaren, Fed. Rep. of Germany

[21] Appl. No.: 594,874

[22] Filed: Mar. 29, 1984

[30] Foreign Application Priority Data

Apr. 2, 1983 [DE] Fed. Rep. of Germany ....... 3312090

[51] Int. Cl.⁴ .............................................. F16D 1/00
[52] U.S. Cl. ................................. 403/228; 267/57.1 R
[58] Field of Search ............... 403/225, 228, 221, 226, 403/222, 224, 203; 267/57.1 R, 63 R

[56] References Cited

FOREIGN PATENT DOCUMENTS 533960 2/1941 United Kingdom ............ 267/63 R
919351 2/1963 United Kingdom ............... 403/226

Primary Examiner—Andrew V. Kundrat
Attorney, Agent, or Firm—McGlew and Tuttle

[57] ABSTRACT

An elastic joint comprises an intermediate socket of an elastic material which firmly adheres to, and is clamped between, a housing and an inner part and which has a constant thickness in the main load direction, over a substantial portion of its width perpendicular to the main load direction.

9 Claims, 4 Drawing Figures

ELASTIC JOINT

FIELD AND BACKGROUND OF THE INVENTION

The present invention relates in general to articulating joints having elastic parts therein, and in particular to a new and useful joint, particularly for mounting arrangements in a vehicle, which utilize an elastic member having a constant material thickness in a zone extending across a main force direction to which the joint is to be exposed.

The invention particularly relates to elastic joints of this kind for high loads, such as loads occurring in axle suspensions of motor vehicles, especially rucks. Elastic joints in which loads are taken up by deformtions of the intermediate socket are known in a design for a ball-and-socket joint from German patent No. 28 31 470, and in a design for a pivot joint from U.S. Pat. No. 3,147,964. What is common to these two prior art designs is that in sections in the main load direction and passing through the longitudinal axis of the inner part, both the inner contour of the housing and the outer contour of the inner part are circular, so that the sectional areas of the intermediate socket clamped therebetween are annular segments having a constant radial width. This means that in the main load direction, the thickness of the intermediate socket varies, and considerably varying surface pressures are produced. In such prior art joints, the thickness of the intermediate socket considered in the load direction increases from the center to both sides, so that vice versa, the produced pressures increase from the sides to a maximum at the center.

SUMMARY OF THE INVENTION

The present invention is directed to a joint of the above mentioned kind in which a more uniform load distribution is obtained in the intermediate socket, thus a more uniform surface pressure is obtained by changing the cross-sectional configuration of the intermediate socket.

Accordingly, an object of the present invention is to provide a joint having an outer housing with an inner surface and an inner part with an outer surface spaced from the inner surface, an elastic material member between the inner and outer surfaces and fixed to the housing and the inner part, the joint being exposable to a force in a main force direction and the elastic material having a constant material thickness in the zone across the load direction.

In practice and with a substantially spherical inside of the housing, this is obtained by providing, within the mentioned zone to both sides of the central plane, identical radii of curvature for the inner surface of the housing and the outer surface of the inner part, only with different centers of curvature, namely with these centers offset in the load direction. With other than spherical insides of the housing, an equidistant extension in the load direction must be ensured in the load zone to both sides of the central plane, for the inside surface of the housing and the outer surface of the inner part.

The invention may be applied to joints comprising an inner part both in the shape of a substantially cylindrical pivot or a ball stud, and in another shape. As in the prior art, the intermediate socket is made of rubber, or of a plastic having similar properties. On the contact surfaces, the intermediate socket may firmly adhere to the housing and the inner part, partly, or over the entire area.

The result obtained with the invention is that the thickness of the elastic material of the intermediate socket, in the direction of the acting load, is constant over the entire critical zone. This means a uniform surface pressure and thus a longer life of the joint.

A further object of the invention is to provide an elastic joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference it made to the accompanying drawings and descriptive matter in which a preferred embodiment of the invention is illustrated.

DESCRIPTION OF THE PREFERRED EMBODIMENT

Figure 1:
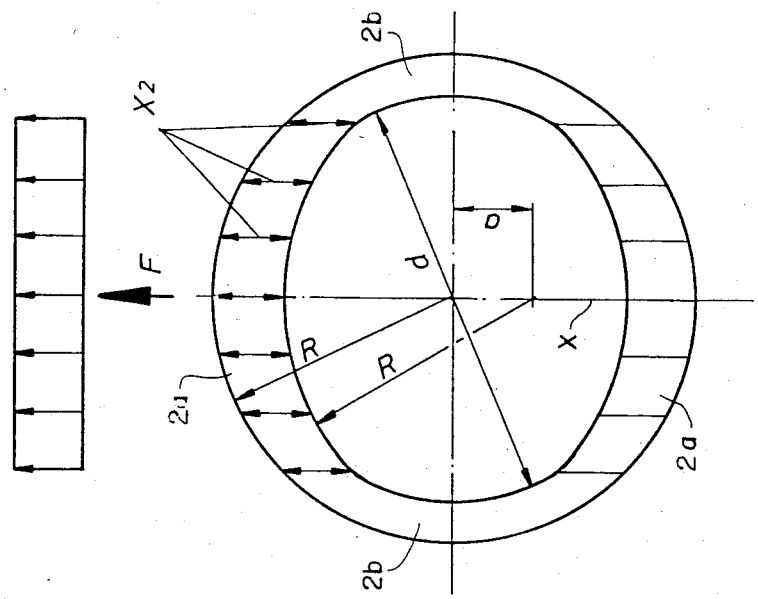
FIG. 1 is a graphic representation indicating the load distribution in a prior art joint.

Referring to the drawings, FIG. 1 shows the load acting on an intermediate socket in an annular space between the outer housing and the inner part of the joint. This annular space is formed between two surfaces, having unequal diameters D and d, but a common center, so that the height of the space or thickness of the material therein, both considered in the direction of the acting load F, increases from the center to both sides. The smallest thickness or height X1 in the mentioned direction is at the center. This results in a load distribution as shown in the upper part of FIG. 1, namely a peak load in the center of the curvature where consequently, the joint is stressed most.

Figure 2:
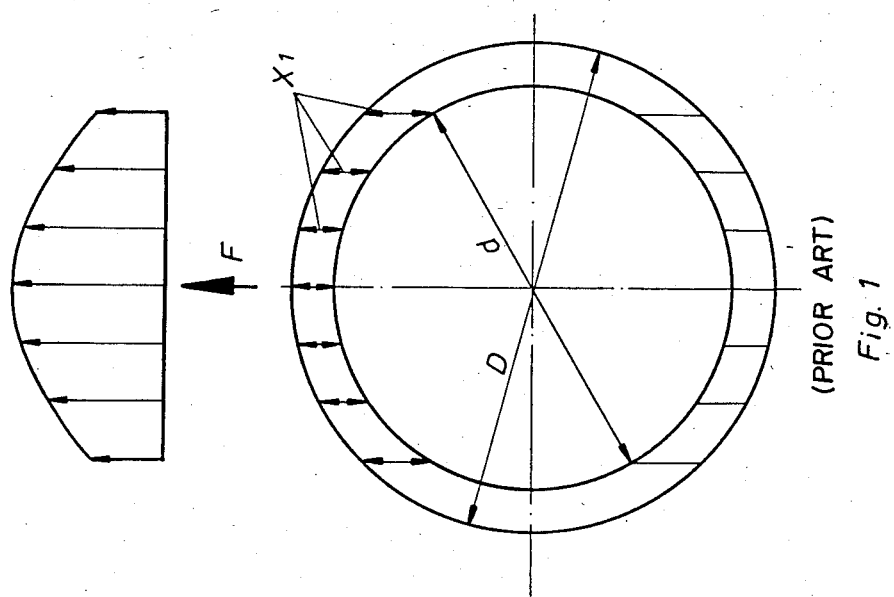
FIG. 2 is a similar showing for an inventive joint.

FIG. 2 shows that the height X2 of the intermediate socket between the outer housing and the inner part in the loaded zone is about constant. With circular contours of the housing and the inner part, this is obtained in a simple way by providing the same radius of curvature R for both the contours, only with the center of curvature offset relative to each other by a distance a. The result is a uniform distribution of the surface pressure caused by the load F, so that the produced forces correspond to the graph of FIG. 2.

Figure 3:
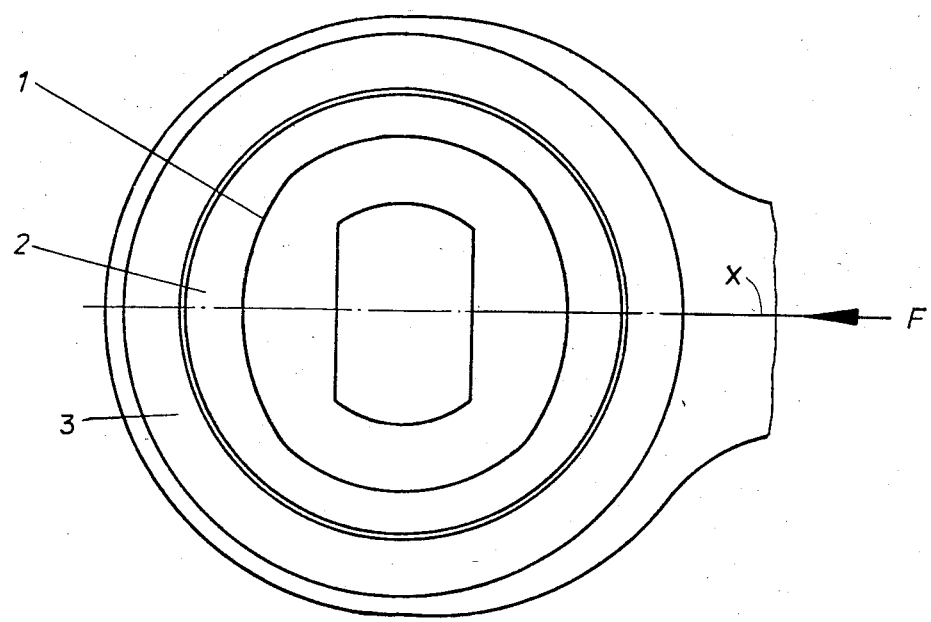
FIG. 3 is a side elevation of an inventive joint.
Figure 4:
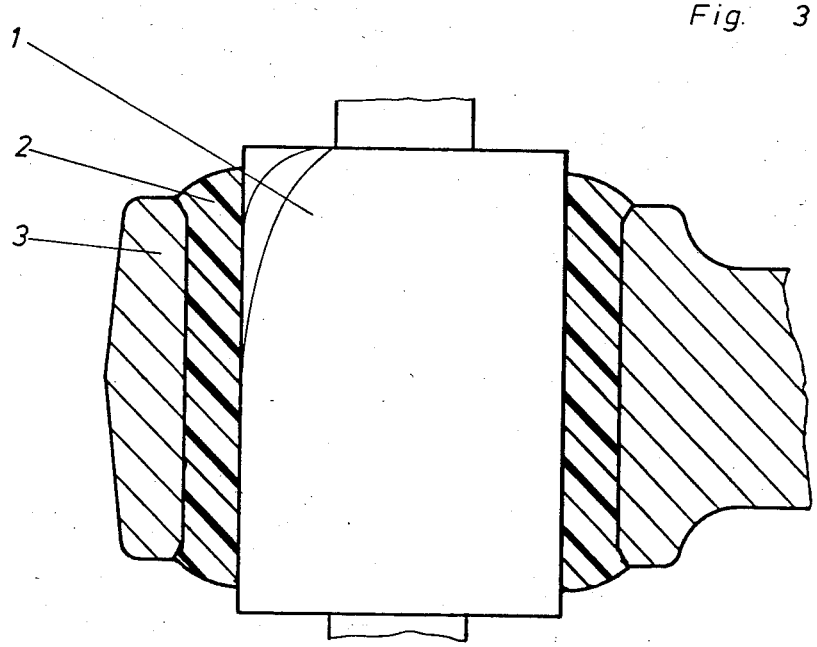
FIG. 4 is a sectional view corresponding to FIG. 3, and taken in the central plane through the axis of the inner part and in the load direction.

FIGS. 3 and 4 show an embodiment having the inventive features. Between an inner part or housing 1, for example, in the shape of an eye, or roughly the shape of an ellipse, and an outer part or housing 3, an intermediate socket 2 of rubber, or of a plastic of comparable properties, is received. Intermediate socket or member 2 may be connected to the outside surface of housing 1 and to the inside cylindrical surface of part 3 so as to firmly adhere thereto, e.g. by adhesive or vulcanizing action. Outer part 3 has an arm part of which is shown in FIG. 3, which extends radially in the force direction F. Intermediate socket 2 may be mounted in radially prestressed state (i.e. compressed), or even prestressed axially, and end pieces may be oppositely tensioned in the direction of the longitudinal axis of the inner part.

To both sides of a central plane X through the longitudinal axis of inner part 1 and through the load direction F, the outside surface of housing 1 and the inside surface of inner part 3 extend equidistantly within a certain zone 2a (FIG. 2). With circular cross sections, this may be done in a simple manner by providing identical radii of curvature R,R which, however, have their centers of curvature offset in the direction of the mentioned plane.

FIG. 2 shows the plan view shape of the intermediate elastic member or socket 2. To either side of plane X, which runs parallel to the main force direction F, the member 2 has portions 2a, 2a which has a width in the force direction that is constant across this area. Areas 2a, 2a are connected by thinner areas 2b,2b which are at the sides of member 2. Portions 2b,2b have inner diameters which are less than the outer diameters thereof and which are concentric with each other.

While a specific embodiment of the invention has been shown and described in detail to illustrate the application of the principles of the invention, it will be understood that the invention may be embodied otherwise without departing from such principles.

What is claimed is:

1. In a joint having an intermediate socket (2) of elastic material adheringly clamped between a housing (3) and an inner part (1), the improvement wherein, in a zone extending to both sides of a central plane (X) of the inner part, passing through a main loading direction (F), and considered in sections parallel to this central plane, the intermediate socket has a constant material thickness.

2. A joint according to claim 1 wherein considered in sections parallel to the central plane through the longitudinal axis of the inner part and through the load direction, the inside surface of the housing and the outer surface of the inner part extend equidistantly.

3. A joint according to claim 1, wherein the inside surface of the housing and the outer surface of the inner part have the same radius of curvature within said zone extending to both sides of the central plane, said radii have their centers of curvature offset (a) in the load direction (F), said inside surface being cylindrical and having said radius of curvature.

4. A joint according to claim 3, wherein said housing includes an outwardly extending radial arm extending parallel to the load direction.

5. An elastic joint comprising:
an outer housing defining a ring having an inner cylindrical surface;
an inner member disposed in said ring and having an outer surface spaced from said inner surface of said ring;
an elastic annular member disposed in said space;
said joint adapted to receive force in a force direction and having a central plane therethrough extending in said force direction, said elastic annular member having a constant material thickness on either side of said plane across most of a width of said elastic annular member;
said elastic annular member having front and rear portions of constant thickness and a pair of side portions connecting said front and rear portions together having a varying thickness which is less than the constant thickness of said front and rear portions, said front and rear portions having inner and outer radii which are equal to each other with a center of an inner radius of each front and rear portion being offset in the force direction from an outer radius of each front and rear portions, said side portions having inner radii which are smaller than outer radii thereof, said inner cylindrical surface of said outer housing having a radius equal to said outer radius of said front and rear portions.

6. A joint according to claim 5, wherein said inner radii of said front, rear and side portions are fixed to said outer surface of said member and said outer radii of said front, rear and side portions are fixed to said inner surface of said outer housing.

7. A joint according to claim 6, wherein said elastic annular member is in a compressed state between said inner member and said housing.

8. A joint according to claim 7, wherein said inner member is a cross section in a direction perpendicular to said plane which is substantially elliptical with a major axis lying perpendicular to the force direction and a minor axis lying parallel to the force direction.

9. A joint according to claim 6, wherein said outer housing includes a radially extending arm extending parallel to the force direction.

* * * * *